United States Patent Office 2,705,681
Patented Apr. 5, 1955

2,705,681

BITUMINOUS COMPOSITION AND PROCESS OF MAKING IT

Thomas J. Wishlinski, Lansing, Ill., and Maurice W. Stacy, Valparaiso, Ind., assignors to Standard Oil Company, Chicago, Ill., a corporation of Indiana No Drawing. Application September 29, 1951, Serial No. 249,008

13 Claims. (Cl. 106—273)

This invention relates to improved coating promoters for asphalts and road oils and methods of preparing same. More particularly it relates to adjuncts for promoting the adherance of bitumen to wet mineral aggregates which adjuncts contain preferentially water-insoluble soaps of sulfonic acids derived from acid sludges resulting from the sulfuric acid treatment of hydrocarbon oils.

Bituminous materials, such as normally liquid road oils and normally liquid to normally solid asphalts, ordinarily require the addition thereto of an adjunct to promote the adhesiveness of the bitumen to wet mineral aggregates. These adjuncts commonly comprise a substantial proportion of a surface active agent; as such, the soaps of petroleum sulfonic acids have found considerable use. It has previously been found that the sludge obtained in the treatment of hydrocarbon oils with concentrated or fuming sulfuric acid is a source of particularly effective sulfonic acids applicable for this use. It is an object of the present invention to provide a stable, homogeneous adjunct for incorporation in paving asphalt and the like containing preferentially water-insoluble soaps of sulfonic acids derived from sulfuric acid sludges. Another object is to provide an adjunct, containing a substantial amount of such water-insoluble soaps, which is readily compatible with and easily dispersed in bitumens such as asphalts, road oils, etc.

A further object of the invention is to provide a method of preparing a stable, homogeneous adjunct for addition to bitumens which comprises a substantial proportion of water-insoluble sulfonates derived from acid sludge admixed with an aromatic hydrocarbon and a mixture of mononuclear aromatic hydroxy compounds. Other objects and advantages will be from the following detailed description.

In accordance with the present invention, the adjunct is preferably prepared by forming preferentially water-insoluble sulfonates in situ in a hydrolyzed acid sludge in the manner hereinafter described. Such sulfonates obtained from sludge by other well-known methods may likewise be used in accordance herewith. The sludge employed may be a total sludge resulting from the treatment of a mineral oil with concentrated or fuming sulfuric acid, preferably, in a series of dumps of, for example, 0.5 pound of acid per gallon of oil per dump to a total of from about 0.5 to 9.0 pounds of acid per gallon of oil or more preferably a selected upper portion of such a sludge may be employed. Such a selected portion may be obtained by permitting the sludge to settle after each dump and discarding the lower 10 to about 60 per cent thereof and then combining the remaining upper portions of each dump. Similarly, the sludge from each dump may be drawn off, combined, and settled in a single operation after which the lower portion may be removed therefrom. The remaining upper portion, however obtained, is then hydrolyzed and weak acid resulting from hydrolysis is separated. After withdrawing the weak sulfuric acid layer the remainder of hydrolyzed mix, commonly referred to as "liver," is diluted with water. It is important that the "liver" be sufficiently diluted with water at this point prior to the neutralization step, since in a properly diluted "liver" the sulfonate formed upon neutralization is preferentially precipitated rather than the sulfate thus resulting in a sulfonate of low salt content. The dilution required to obtain the preferential precipitation of the sulfonate is dependent upon the concentration of sulfonic acid and sulfuric acid in the "liver." In general, the "liver," or separated hydrolyzed sludge, should be diluted with more than about 3 volumes of water, and preferably at least 5 volumes of water for each volume of "liver."

The diluted "liver" is then heated to a temperature of from about 90° F. to about 200° F. and preferably from about 120° F. to about 150° F. and the sulfonic acid is neutralized with a suitable neutralizing agent. Suitable neutralizing agents for use herein are, for example, an oxide, hydroxide or carbonate of the desired metal, for example, an alkaline earth metal such as calcium, strontium, barium or a heavy polyvalent metal such as lead, iron, zinc, copper, cobalt, manganese, etc., although the alkaline earth metals, particularly calcium are preferred. Other suitable neutralizing agents are basic nitrogenous compounds such as amines, etc. The neutralizing agent, e. g. calcium oxide (lime), is preferably added in the form of a slurry and the reaction mixture agitated such as by air blowing, to accelerate the reaction and prevent excessive settling of the neutralizing agent.

After the desired amount of the neutralizing agent has been added, the precipitated metal sulfonate is allowed to settle and the supernatant liquid drawn off, the aromatic hydrocarbon of the type hereinafter disclosed is added to the crude sulfonate mixture in amounts of from about 25 per cent to about 75 per cent by weight, and preferably from about 35 per cent to about 60 per cent by weight. After the crude sulfonate and the aromatic hydrocarbon are well mixed, sufficient neutralizing agent is added to completely neutralize the residual acidity of the material. At this point the dehydration of the mix is begun and the water content of the mix is lowered to from about 1 per cent to about 35 per cent, preferably to from about 1 per cent to about 8 per cent. During dehydration, the viscosity of the mix is increased as the water is removed resulting in a very stiff, difficultly handled mixture. This problem is eliminated by adding to the mix before or during the dehydration step an amount of from 2 to about 35 per cent preferably from about 10 to about 25 per cent of cresylic acid. The cresylic acid thus added effectively cuts the viscosity and exerts a solubilizing effect upon both sulfonates and aromatic to maintain a homogeneous mixture.

The term cresylic acid as employed herein is descriptive of any of the variety of mixtures of hydroxy mononuclear aromatic compounds having a boiling range of from about 350° F. to about 500° F., which compounds react with caustic to form cresylates, or phenylates as they are generally referred to, from which the hydroxy aromatics can be regenerated by treatment with an acid. The sources of cresylic acid are primarily petroleum and coal tar, the commercial product containing isomeric cresols associated with similar hydroxy aromatic compounds and certain other compounds. The commercial forms of cresylic acid usually contain lower boiling hydroxy aromatics such as phenol which by itself is not suitable for use in accordance herewith as well as certain higher boiling hydroxy aromatics such as the xylenols, etc. Such mixtures of hydroxy aromatics, obtained from coal tar, petroleum or any other source, or the more refined products thereof such as isomeric mixtures of the cresols or individual mononuclear hydroxy aromatic compounds of the class described, are suitable for use in accordance with the present invention. For purposes of illustration, however, the present invention will be described with particular reference to a petroleum cresylic acid having the following general physical characteristics:

Specific gravity_____ 1.030 to 1.040
Distillation, °F.:
   5%_____ 350° to 380°
   95%_____ 415° to 450°
Neutral oil, per cent_____ 1.0 to 3.0
Total sulfur, per cent_____ 0.10 to 0.20
Water, per cent_____ 5 to 20

It is important when employing the above described dilution technique for recovering the desired sulfonates from sludge that the finished mixture contain no more than the maximum amount of water indicated herein above since the presence of larger amounts of water increases the danger of phase separation of the soap from the aromatic hydrocarbon.

The composition obtained in the manner described preferably contains the following components in the following approximate proportions:

|  | Range (percent) | Preferred Range (percent) |
|---|---|---|
| Preferentially water-insoluble sulfonate | 10 to 50 | 20 to 30. |
| Aromatic hydrocarbon | 0 to 75 | 35 to 60. |
| Cresylic acid | 2 to 60 | 10 to 25. |
| Water | 1 to 35 | 1 to 8. |
| Hydrocarbon oil | 0 to 30 | 5 to 10. |

The hydrocarbon oil referred to above is that oil which ordinarily is present with the precipitated sulfonates when they are recovered from the sludge after acid treatment of an oil. No effort is made to eliminate this material.

An effective adjunct can be prepared when a part or all of the aromatic hydrocarbon solvent is replaced by cresylic acid which, because of its aromatic nature, very satisfactorily serves the function of solvent for the sulfonates in addition to acting as a viscosity adjustment agent. Since the cresylic acid then serves a dual function, the volume of final adjunct may be reduced in an amount relative to the amount of aromatic hydrocarbon replaced; thus the volume may be reduced by as much as 25 per cent if all of said aromatic were eliminated in favor of cresylic acid.

Cresylic acids may be obtained from gasoline and naphtha fractions of some straight run and most cracked stocks by alkali treatment and are usually available as crude caustic-cresylate solutions at those refineries where caustic treatment of such oils is carried out, such as for the purpose of desulfurization. Various processes are in general use throughout the petroleum industry in which aqueous caustic alone or in conjunction with a solutizer is employed to treat petroleum fractions. In such processes there is produced at some stage a so-called spent caustic-cresylate or caustic-phenolate stream which is potentially an excellent source of cresylic acid suitable for use in the present invention. These crude spent caustic-phenolate streams may be used as such in accordance with the present invention but since they are usually high in mercaptan sulfur which is extremely odoriferous, it is ordinarily desirable the odor first be improved. Any of the known methods for accomplishing such a sweetening operation is applicable hereto. A particularly effective method of improving the odor and eliminating the mercaptans is to acidify the caustic-phenolate solution to a pH just above that at which the phenolates are decomposed and then to blow with air, in the presence of a suitable catalyst such as nickel sulfate if desired, at a temperature of about 150° F. The disulfides thus formed form a separate phase which is drawn off and the solution is then washed one or more times with a suitable neutral oil to complete the removal of disulfides. Further acidification of the essentially sulfur-free solution results in decomposition of the cresylates to cresylic acid which may be recovered from the water-salt layer after settling. The crude cresylic acid can then, if desired, be further purified by distillation, etc. Petroleum processes in which a caustic-phenolate stream is produced are the Mercapsol Process, Solutizer Process and the Tannin-Solutizer Process all of which are described in detail in the "Process Handbook Edition" of the "Petroleum Refiner" for September of 1948.

Aromatic hydrocarbons suitable for use in accordance with the present invention are preferably those having a boiling point above about 220° F. at atmospheric pressures and includes mononuclear aromatic hydrocarbons, such as the xylenes, and poly-nuclear or condensed ring aromatics, such as naphthalenes, alkylated naphthalenes, such as methylated naphthalenes and ethylated naphthalenes, and mixtures of the higher boiling mononuclear aromatic hydrocarbons and polynuclear hydrocarbons.

A preferred source of mixed aromatic hydrocarbons suitable for use in the present invention is a light catalytic cycle stock obtained from a catalytic hydrocarbon cracking operation in which gas oil or heavier hydrocarbons, such as reduced crude, are cracked at a temperature of about 800° F. to 1050° F. at a pressure of about atmospheric to 50 pounds per square inch in the presence of suitable catalysts, such as for example, silica-alumina, silica-magnesia and other well-known cracking catalysts. A method of conducting a fluidized catalytic cracking operation is described in U. S. 2,341,193 issued to Fred W. Scheineman, February 8, 1944. The fraction suitable for use in the present invention is a heavier-than-gasoline fraction usually recycled to cracking. These fractions, depending upon their boiling range, are commonly referred to as light cycle stock and heavy cycle stock. A catalytic light cycle stock particularly well suited for this invention is a fraction having an aromatic content of at least about 40 to about 50 per cent, and a distillation range between about 425° F. and about 560° F. A typical analysis of a suitable light catalytic cycle stock shows the material to be composed substantially of about 10 per cent normal $C_{12}$ to $C_{20}$ paraffins, about 45 per cent of other paraffins and naphthenes, about 5 per cent mononuclear aromatics which are mainly mono- to hexa-alkylated benzenes, and about 40 per cent polynuclear aromatics which are mainly alkyl naphthalenes, largely methylated naphthalenes. A typical light catalytic cycle stock will give the following A. S. T. M. distillation:

| | °F. |
|---|---|
| Initial boiling point | 430 |
| 10% over | 448 |
| 50% over | 478 |
| 90% over | 518 |
| Maximum boiling point | 552 |

While we prefer to use a light cycle stock from a catalytic cracking operation of the type above-described, hydrocarbon fractions from other catalytic hydrocarbon conversion processes or thermal hydrocarbon conversion processes are suitable provided they have a sufficiently high aromatic content, at least 40 to 50 per cent, and have suitable distillation characteristics, i. e. boiling above about 220° F.

In place of using the whole catalytic cycle stock we may extract the aromatic components from the cycle stock and use the aromatic extract. The aromatics may be extracted by extraction with the usual and known solvents, such as for example, liquid hydrogen fluoride, nitromethane, liquid sulfur dioxide, etc.

Other mixed aromatic hydrocarbons suitable for use in the present invention are mixtures of aromatic hydrocarbons produced by the catalytic conversion of aliphatic hydrocarbons by the so-called hydroforming process. This mixture is known in the petroleum refining art as "catalytic reform naphtha bottoms," "hydroformer polymers," or "hydroformer bottoms." They will be referred to hereinafter as "hydroformer polymers." A process by which the hydroformer polymers are obtained is described in U. S. Patent No. 2,320,147. Briefly, the process comprises treating virgin or cracked naphtha or mixtures thereof with a solid porous hydroforming catalyst such as an oxide of a metal of group II to IV of the periodic system, such as the oxide of chromium or molybdenum, suitably supported on alumina or magnesia. The conversion is suitably carried out at a temperature of 850° F. to 1050° F. and, if desired, in the presence of hydrogen. The hydroformer products are fractionated by taking overhead a catalytically reformed gasoline of suitable end point and recovering the higher boiling materials as bottoms, which boil from about 400° F. to about 750° F., and have gravities of from about 10° API to about 18° API. A typical vacuum distillation of a hydroformer sample having a gravity of about 12° API shows the following composition:

| Fraction | Components |
|---|---|
| 0-2% | Toluene. |
| 2-8% | Xylenes. |
| 8-14% | 1,3,5-Trimethylbenzenes. |
| 14-17% | 1,3,4-Trimethylbenzene. |
| 17-22% | 1,2,3-Trimethylbenzene. |
| 22-27% | Tetramethylbenzene. |
| 27-37% | Naphthalenes. |
| 37-59% | Monomethylnaphthalenes. |
| 59-61% | Diphenyl. |
| 61-74% | Dimethylnaphthalenes. |
| 74-78% | Methyldiphenyls. |
| 78-83% | Trimethylnaphthalenes. |
| 83-87% | Fluorene. |
| 87-89% | Methylfluorenes. |
| 89-94% | Anthracene and Phenanthrene. |
| 94-97% | Methylanthracenes and Methylphenanthrenes. |
| 97-98% | Pyrene. |
| 98-100% | Tetracyclics and Higher. |

A representative hydroformer bottoms fraction exhibits the following physical properties:

| | |
|---|---|
| API gravity | 11–22 |
| Refractive index $n_D^{20}$ | 1.5911 |
| Specific dispersion | 264 |
| ASTM distillation: | |
| Initial °F | 448 |
| 10% °F | 465 |
| 20% °F | 472 |
| 30% °F | 477 |
| 40% °F | 484 |
| 50% °F | 490 |
| 60% °F | 501 |
| 70% °F | 516 |
| 80% °F | 545 |
| 90% °F | 620 |
| Max. (92% off) °F | 750 |

Either the entire hydroformer polymer or lower boiling fractions thereof, such as the 0 to 90 per cent fraction boiling between about 400° F. and 600° F. or the 0 to 50 per cent fraction boiling between about 400° F. and 500° F. may be used.

While the sulfonic acids employed in this invention may be obtained from acid sludges resulting from the treatment of viscous hydrocarbon oils having Saybolt Universal viscosity of from 80 seconds to 900 seconds at 100° F. with 0.5 to 9 pounds of concentrated or fuming sulfuric acid per gallon of oil being treated, it is preferred to employ the acid sludges obtained in the treatment of hydrocarbon oils with 2 to 4 pounds of fuming sulfuric acid per gallon of oil being treated.

The present invention will be more fully described and understood by reference to the following specific examples which are illustrative and in no way intended to limit the scope of the invention.

EXAMPLE I

A portion of a liver recovered after hydrolysis of a technical white oil acid sludge resulting from the treatment of the oil with 3.0 pounds of fuming sulfuric acid per gallon of oil was diluted with 5 volumes of water and contacted with a slurry of lime. The calcium sulfonates which precipitated were mixed with 65 grams of crude cresylic acid (5.4 per cent water) to give 320 grams of a mixture which comprised 104 grams (32.5 per cent) water, 61.5 grams (19.2 per cent) cresylic acid and the remainder calcium sulfonate. The mixture of soap, cresylic acid and water was then dehydrated by air blowing at a temperature of from about 180° F. to about 230° F. to a water content of 5 per cent. Only 17.8 per cent of the cresylic acid originally present (based on 0% water) was lost overhead during the dehydration. A completely homogeneous mixture existed at all times which, however, due to addition of an insufficient quantity of cresylic acid initially, was somewhat too viscous for best results as an adjunct. An additional 104 grams of cresylic acid were therefore added to 171 grams of the dehydrated mixture and the total mix was heated with agitation to about 215° F. to obtain the desired viscosity. Approximately 2 per cent of the finished additive in a cut-back asphalt demonstrated good coating properties and acceptable stripping resistance.

EXAMPLE II 67 pounds of a calcium sludge acid sulfonate-catalytic cycle stock mixture, prepared by adding aromatic cycle stock to a preferentially precipitated soap obtained from the liver of a 2.5 pound technical white oil sludge (i. e. a sludge resulting from treatment of a technical white oil with 2.5 pounds of fuming sulfuric acid per gallon of oil in 0.5 pound dumps), were combined with 68 pounds of cresylic acid and mechanically agitated to completely mix the constituents and give a homogeneous mixture. The original sulfonate-aromatic mixture had been dehydrated to a water content of about 6 per cent prior to admixing the cresylic acid therewith but due to the cresylic acid having a water content of about 12 per cent further dehydration with air blowing up to a temperature of about 250° F. was carried out to give a final product having a water content of 1.3 per cent. This finished adjunct containing 23 per cent soap, was then added to a cut-back asphalt having the following physical characteristics:

| | |
|---|---|
| Flashpoint, °F | 155 |
| Furol viscosity at 140° F | 152 |
| Distillation per cent of total distillate to 680° F.): | |
| To 437° F | 0 |
| To 500° F | 18.2 |
| To 600° F | 75.0 |
| Penetration of residue at 77° F | 225. |
| Ductility of residue at 60° F | 127 |
| Solubility of residue in CCl$_4$ % | 99.7 |
| Spot test (Oliensis) | Neg. |

The results of application of the above asphalt containing the additive, in an amount sufficient to give 1.3 per cent calcium sulfonate in the asphalt, in paving tests conducted with mechanical paving equipment are set forth in Table I.

EXAMPLE III

A technical white oil sludge, at the 2.5 pound level, was settled and 2500 gallons were withdrawn from the bottom and discarded and the remaining 6000 gallons were then hydrolyzed in 10,000 gallons of water. At the 3.0 pound treating level, a sludge was again settled and the lower 2700 gallons were then withdrawn and discarded and the upper 4400 gallons were hydrolyzed in the weak acid-liver mix resulting from hydrolysis of the 2.5 pound sludge. After settling, the weak acid resulting from hydrolysis was separated and discarded. In the laboratory, 216 grams of the combined liver were then diluted with 1000 cc. of water and sufficient lime slurry (30 grams of lime) was added to totally neutralize all acidity and to precipitate calcium sulfonate. 161 cc. of light catalytic cycle stock were added to the precipitated soap and the mix was dehydrated to a water content of 3.8 per cent At this point 110 grams of the dehydrated mix was mixed with 12 cc. cresylic acid, comprising 10 per cent water, for the purpose of adjusting the viscosity. Laboratory tests of a cut-back asphalt of the type described in Example II, containing 2 per cent of the above additive, gave 95 per cent or better coating with both wet sand and wet limestone. The test employed, a particularly stringent one, consisted of placing the aggregate in a vessel and completely covering the aggregate with tap water following which the cut-back containing the additive is poured on top of the water. After vigorously shaking the vessel the percentage coating of the aggregate with bitumen is estimated.

EXAMPLE IV

A technical white oil sludge at the 2.5 pound level was settled and 3080 gallons were withdrawn from the bottom and discarded and the remaining 4240 gallons were then hydrolyzed in 10,000 gallons of water. At the 3.0 pound treating level, a sludge was again settled and the lower 2700 gallons were then withdrawn and discarded and the upper 4600 gallons were hydrolyzed in the weak acid-liver mix resulting from hydrolysis of the 2.5 pound sludge. After settling, the weak acid amounting to 10,000 gallons resulting from hydrolysis was separated and discarded. 46,700 gallons of water were then added to 8800 gallons of the combined liver and sufficient lime slurry (8800 pounds of lime) was added to totally neutralize acidity and to precipitate calcium sulfonates. In the laboratory 400 grams of the precipitated soap were mixed with 280 cc. of light catalytic cycle stock following which the water content of the mix was reduced to 1.6 per cent while raising the temperature to about 230° F with air blowing. 45 cc. of petroleum cresylic acid were then added to 182 grams of the above dehydrated mixture and mixed in thoroughly for the purpose of adjusting the viscosity of the finished additive. 2 per cent of the additive in a cut-back asphalt gave 80 per cent coating of wet sand and 90 to 95 per cent coating of wet limestone in the test described in Example III.

EXAMPLE V

To 200 grams of the precipitated soap obtained in accordance with Example IV were added 140 cc. of light catalytic cycle stock and about 50 cc. of cresylic acid. This mixture was dehydrated to a water content of 3.6 per cent and at all times presented a stable homogeneous appearance. When 2 per cent of this additive was incorporated in a cut-back asphalt like that employed in the other examples 85 per cent coating of wet sand and 95 per cent coating of wet limestone were obtained in the test described.

The sulfonate composition of the herein described invention is especially well suited as an additive for oils and bituminous coating materials such as road oils, asphalts, etc., to promote adherence to wet mineral aggregates, and to prevent or reduce the tendency of such materials to be stripped by water from mineral aggregates. The amount of the sulfonate composition to be used depends upon several factors, among which are the type of oil or bituminous materials employed, the area of the aggregate-bitumen interface, the characteristics of the aggregate material, the severity of the conditions of use, etc. It will be appreciated that these factors are interdependent to some extent, and that, therefore, the quantity of sulfonate composition which can be used most advantageously will be determined for the individual combination of bitumen and aggregate. In general the amount of sulfonate composition used to produce the best effects should be sufficient to produce a bitumen composition having from about 0.5 per cent to about 5 per cent, of the 100 per cent metal sulfonate, based upon the bitumen used.

Set forth below, in Table I, are data indicating the effectiveness of an asphalt containing the adjunct prepared in Example II as compared to the same asphalt containing no adjunct. These data indicate the effect of such adjuncts in an experimental paving operation in which mechanical paving equipment was employed to lay a strip of highway. The results given are the consensus of several experienced observers' visual observation of the coated aggregate. All of the test strips were laid with cut-back asphalt of the type described in Example II and were applied as a 3″ mat at the rate of 11 gallons of cut-back asphalt per ton of aggregate and at a temperature of from 120° F. to about 160° F.

Table I

|  | Wet Limestone | | Damp Limestone | |
| --- | --- | --- | --- | --- |
|  | A [2] | B [3] | A [2] | B [3] |
| Percent Coating | 55 | 60 | 65 | 90 |
| Stripping Resistance [1] | 0 | 35 | 0 | 80 |

[1] Coating retained after pouring water on freshly laid strip.
[2] A = Asphalt containing no additive.
[3] B = Asphalt containing 1.3% calcium sulfonate with cresylic acid.

Percentages given herein and the appended claims are weight per cent unless otherwise stated.

An adjunct for asphalt and the like wherein preferentially water-insoluble sludge acid soaps are mixed with aromatic hydrocarbons, water, mineral oil and an aliphatic alcohol and the method of preparing same are described and claimed in copending application for Letters Patent Serial No. 108,428, which issued as U. S. 2,669,525 on February 16, 1954. In application for Letters Patent Serial No. 244,476, filed August 30, 1951, which issued as U. S. 2,675,329 on March 13, 1954, a method of preparing a superior adjunct of similar composition by processing a selected upper portion of the acid sludge rather than total sludge is claimed.

We claim:
1. The method of preparing a stable homogeneous sulfonate-containing adjunct composition for bituminous paving materials, which method comprises the steps of producing preferentially water-insoluble, polyvalent-metal sulfonates from sulfuric acid sludge, said sludge resulting from the treatment of a hydrocarbon oil with sulfuric acid of at least 95% strength, admixing with the polyvalent metal sulfonates a liquid aromatic hydrocarbon solvent having an initial boiling point of at least 220° F., adding to such admixture an amount of from about 10% to about 60% of at least one alkylated mononuclear hydroxy aromatic compound of the type predominant in cresylic acid, and adjusting the water content of the resulting mixture to within the range of from about 1 to about 35%.

2. The method of preparing a stable homogeneous sulfonate-containing adjunct composition for bituminous paving materials, which method comprises the steps of producing preferentially water-insoluble, polyvalent-metal sulfonates from sulfuric acid sludge, said sludge resulting from the treatment of a hydrocarbon oil with sulfuric acid of at least 95% strength, admixing with said sulfonates an aromatic hydrocarbon solvent having an initial boiling point of at least 220° F., adding to such admixture an amount of from about 2% to about 35% of cresylic acid derived from petroleum, which cresylic acid boils chiefly in the range of from about 350° F. to about 500° F., and adjusting the water content of the resulting mixture to within the range of from about 1 to about 35%.

3. The method of preparing a stable homogeneous sulfonate-containing adjunct composition for bituminous materials which method comprises the steps of substantially freeing a sulfuric acid sludge from unreacted sulfuric acid, said sludge having been produced by the treatment of a hydrocarbon oil with sulfuric acid of at least 95% strength, diluting the substantially sulfuric acid-free sludge with more than about 3 volumes of water to each volume of sludge, adding a sufficient amount of a basic metal compound to neutralize the sulfonic acids in said diluted sludge and to precipitate preferentially water-insoluble metal sulfonates therefrom, admixing with said precipitated sulfonates an amount of from about 10 to about 60% of at least one alkylated mononuclear hydroxy aromatic compound of the type predominant in cresylic acid derived from petroleum, admixing therewith from about 25% to about 75% of an aromatic hydrocarbon having an initial boiling point of at least 220° F., and dehydrating the mixture to a water content between about 1 and about 35%.

4. The method of claim 3 wherein the aromatic hydrocarbon is an aromatic fraction boiling within the range of from about 400° to about 550° F., which fraction is produced by the catalytic conversion of aliphatic hydrocarbons.

5. The method of claim 3 wherein the alkylated mononuclear hydroxy aromatic compound is derived from cresylic acid.

6. The method of claim 3 wherein the basic metal compound is an alkaline earth basic compound.

7. The method of claim 3 wherein the basic metal compound is calcium oxide.

8. The composition comprising a bitumen and from about 0.5% to about 5.0% of a mixture comprising about 10 to about 50% of a preferentially water-insoluble, polyvalent-metal sulfonate derived from a sulfuric acid sludge, said sludge resulting from the treatment of a hydrocarbon oil with sulfuric acid of at least 95% strength, from about 2% to about 60% of at least one alkylated mononuclear hydroxy aromatic compound of the type predominant in cresylic acid, said alkylated mononuclear hydroxy aromatic compound boiling in the range of from about 350° F. to about 500° F., from 1% to about 35% of water and not more than about 30% of hydrocarbon oil.

9. The composition comprising a bitumen and from about 0.5% to about 5.0% of a mixture comprising from about 10 to about 50% of a preferentially water-insoluble, polyvalent-metal sulfonate derived from a sulfuric acid sludge which sludge results from the treatment of a hydrocarbon oil with sulfuric acid of at least 95% strength, from about 25 to 75% of an aromatic hydrocarbon having a boiling point above 220° F., from about 2% to about 35% of cresylic acid boiling chiefly in the range of from about 350° F. to about 500° F., not more than about 35% water and not more than about 30% hydrocarbon oil.

10. The composition of claim 9 wherein the bitumen comprises a normally liquid petroleum oil residuum.

11. An adjunct for promoting adhesiveness of bitumen to wet mineral aggregate which adjunct comprises at least 10% of a water-insoluble, polyvalent-metal sulfonate derived from a sulfuric acid sludge, which sludge results from the treatment of a hydrocarbon oil with at least 95% strength sulfuric acid, from about 2% to about 60% of at least one alkylated mononuclear hydroxy aromatic compound of the type predominant in cresylic acid derived from petroleum, from 1% to about 35% of water and not more than about 30% of a hydrocarbon oil.

12. An adjunct for promoting adhesiveness of bitumen to wet mineral aggregate, which adjunct comprises from about 10 to about 50% of a water-insoluble, polyvalent-metal sulfonate derived from sulfuric acid sludge, which sludge results from the treatment of a hydrocarbon oil with sulfuric acid of at least 95% strength, from about 25 to 75% of an aromatic hydrocarbon having an initial boiling point above 220° F., from about 2% to about 35% of at least one alkylated mononuclear hydroxy aromatic compound of the type predominant in cresylic acid, from 1% to about 35% of water and not more than about 30% of a hydrocarbon oil.

13. The adjunct of claim 12 where the aromatic hydrocarbon comprises a catalytic cycle oil derived from the catalytic cracking of aliphatic hydrocarbon.

References Cited in the file of this patent

UNITED STATES PATENTS

| | | | |
|---|---|---|---|
| 1,231,985 | Baskerville | July 3, | 1917 |
| 1,301,662 | Divine | Apr. 22, | 1919 |
| 2,002,652 | Alexandroff | May 28, | 1935 |
| 2,033,885 | Derby | Mar. 10, | 1936 |
| 2,151,147 | Junosya | Mar. 21, | 1939 |
| 2,278,954 | Thurston | Apr. 7, | 1942 |
| 2,332,260 | Roediger | Oct. 19, | 1943 |
| 2,509,863 | Harlan | May 30, | 1950 |